Feb. 22, 1944. E. C. HATCHER 2,342,271
CABLE TENSIONING AND RELEASING MEANS
Filed June 24, 1941 3 Sheets-Sheet 1

Inventor
Ernest C. Hatcher
by Sommer & Young
Attorneys

Feb. 22, 1944.  E. C. HATCHER  2,342,271
CABLE TENSIONING AND RELEASING MEANS
Filed June 24, 1941  3 Sheets-Sheet 2
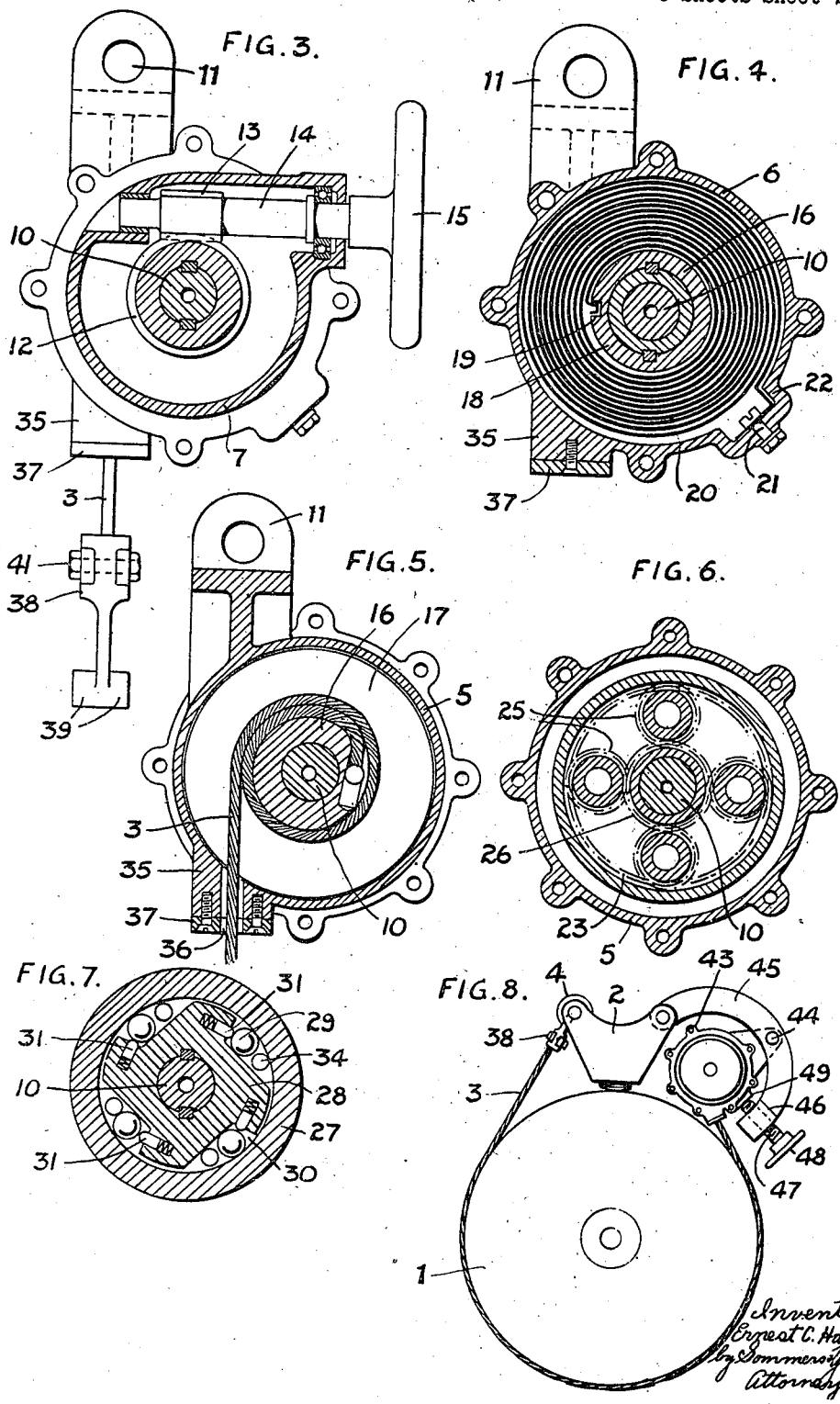
Inventor
Ernest C. Hatcher
by Sommers & Young
Attorneys

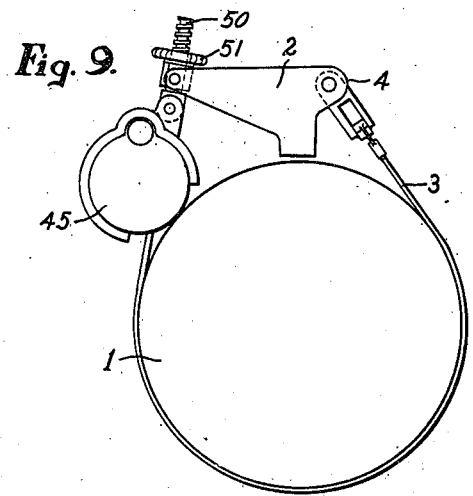
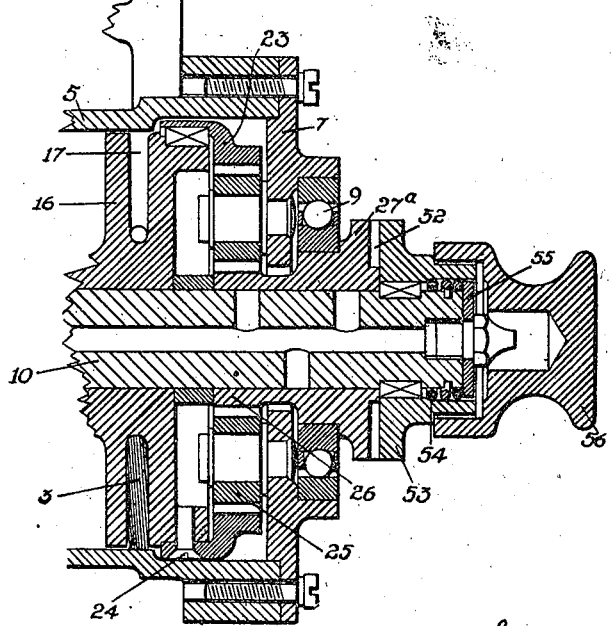

Patented Feb. 22, 1944

2,342,271

UNITED STATES PATENT OFFICE 2,342,271

CABLE TENSIONING AND RELEASING MEANS

Ernest Charles Hatcher, Northwood, England, assignor to J. Stone & Company Limited, Deptford, England, a British joint-stock company Application June 24, 1941, Serial No. 399,537
In Great Britain July 26, 1940

2 Claims. (Cl. 242—103)

This invention relates to improvements in winding and tensioning means for releasable cables and steel tapes, such as are used for supporting and releasing bombs, torpedoes or the like on aircraft. Usually for this purpose, a two-eyed bracket is fixed to an aircraft and a short cable, having one end fixed to one eye, is passed around a bomb which has been elevated against stops or chocks, the opposite end of the cable being then connected to the other eye by a releasable catch. The bomb is thus supported in a cradle or sling and when the operator releases the catch, the cable end falls and swings away as the bomb drops. The violent swing of the cable end with the end fitting attached to it is a cause of damage to the aircraft structure. One object of the invention is to avoid such damage by providing for the automatic winding in of the cable when released, and for the appropriate tensioning of the cable after its end has been drawn out from the winding means, passed around a bomb or the like, and secured to the aircraft to form a cradle. Such tensioning is important for the security of the bomb in its cradle or sling.

According to this invention, one end of the cable or the like, instead of being attached to a fixed eye as aforesaid, is attached to the barrel of a spring drum and is drawn out against the action of the spring in order to be passed around a bomb and have its other end releasably attached in the manner referred to, tensioning means being then adjustable for tightening the cradle or sling formed by the cable. The cradle or sling is advantageously formed by a number of cables of relatively small diameter each being guided into its own deep winding groove in the drum so that it is wound into a number of convolutions one outside of another. If steel tapes are used, the winding grooves need not be so deep. The outer ends of the cables or tapes are attached to a common yoke device adapted for being releasably connected with the eye bracket on the aircraft, such attachment advantageously incorporating adjustments for taking up slack in any cable or tape. In order to enable the tensioning means to be operative upon the cradle or sling, the drawing out of the cable from the spring drum is normally prevented by means of a one-way clutch or detent device which may be of the free-wheel ratchet or face clutch ratchet variety. To enable the cable to be drawn out to form the cradle or sling, means are provided for temporarily holding the detent means of the clutch out of action during such drawing out of the cable. Thus, when the cradle has been formed and the detent means have been released, the operation of the tensioning means becomes effective for tightening the cradle because the cable can no longer be drawn out from the drum. The winding and tensioning means of these improvements can be applied to aircraft without structural alterations being necessary, as a spring drum unit with its tensioning means can be conveniently suspended from one of the eyes of the existing two-eyed bracket hereinbefore referred to.

In order that the invention may be readily understood, reference is directed to the accompanying drawings, in which:

Figures 3–7 are sections on the lines III—III to VII—VII respectively of Figure 2.

Figures 8 and 9 are views similar to Figure 1 of a modification.

Figure 10 is a fragmentary longitudinal section illustrating a modification of the construction seen in Figure 2.

Figure 1:
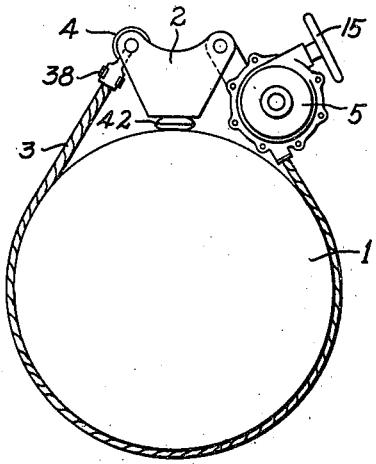
Figure 1 is an end elevation of a bomb or torpedo supported by means in accordance with the invention.

A bomb or torpedo 1 is seen in Figure 1 supported from a two-eyed bracket 2 by means of a sling 3. One end of the sling 3 is connected to the left eye of the bracket 2 by means of a quick release catch 4 and the other end enters and is wound upon the barrel of a spring drum device 5. The drum device is pivotally attached to the right hand eye of the bracket 2 which latter, it will be understood, is secured to the underside of an aircraft.

Referring to Figures 2–7, the spring drum device comprises a cylindrical casing 5 having housings in its end covers 6 and 7 for ball bearings 8 and 9 respectively supporting an axial shaft 10. The casing 5 is provided with suspension eyes 11 for pivotal attachment to the bracket 2 on the aircraft. At one end, to the left in Figure 2, the shaft 10 has keyed to it a worm wheel 12, the driving worm 13 of which is on a horizontal shaft 14 transversely mounted in the cover 6 and fitted, externally of the cover 6, with a hand wheel 15. On the middle portion of the shaft 10 there is revolubly mounted a winding drum 16 formed with a number (eight in the example illustrated) of radially deep grooves 17 for the winding on of a similar number of cables 3 into convolutions lying one outside of another (see Figure 5). The end of the drum 16 adjacent to the worm gear 12, 13 is reduced and has keyed to it a steel collar 18 formed with a recess 19 (Figure 4) for anchoring one end of a flat spiral spring 20, the other end of this spring 20 being anchored by a bolt 21 in a peripheral recess 22 formed in the end cover 6. The opposite end of the drum is fitted with an internally toothed annulus 23, which is fixedly secured to the drum by screws 24. Upon the inner side of the end cover 7 of the casing 5 there are mounted four pinions 25 (see Figure 6), which mesh with the internal teeth of the annulus 23 and also with the external teeth of a sun wheel 26 revoluble around the axial shaft 10 aforesaid. The hub of the sun wheel extends through the cover 7 and is fitted with the inner race of the ball bearing 9 and, externally of the cover 7, is enlarged to form a hollow cylindrical shell 27. The end of the axial shaft 10 within this shell 27 has keyed to it the disc element 28 of a free wheel clutch, balls or rollers 29 (Figure 7) being disposed within shaped notches 30 of the disc 28. Small spring plungers 31 constantly tend to hold the balls 29 in clutching position between inclined edges of the notches 30 and the interior of the cylindrical shell 27. The outer side of a cover 32 of this shell 27 is provided with thumb plates 33 for enabling it to be turned and the inner side is provided with ball or roller engaging studs 34 so that the balls 29 or rollers may be forced into an idle position in the depth of the notches 30 by an appropriate turning of the cover 32.

The casing 5, 6, 7 is formed with a tangential and downwardly presented thickened part 35 having vertical bores 36 (Figure 5) for the guidance of the cables 3 in their passage to and from the drum 16. The downwardly presented face of the thickened part 35 is fitted with a layer 37 of shock-proof material such as rubber. The cable ends passed through the vertical bores 36 aforesaid are fastened to a common yoke 38 formed with laterally extending lugs 39 for engagement with the releasable catch 4. Each cable end may be fitted with an externally screw threaded thimble 40 and the yoke 38, formed with correspondingly screw threaded holes spaced along its length, may be formed in longitudinally divided halves, the line of division passing through the centre of the holes. Each thimble 40 is appropriately disposed in a half hole in one of the divided parts of the yoke, the other part of which is then applied and clamped to the first by bolts 41 so that the thimbles 40 are tightly enclosed in the holes. The screw threading of the thimbles 40 enables the latter to be variably disposed in their holes so as to take up any degree of slackness in any one or more of the cables 3. The operation is as follows:

When a bomb 1 has been elevated against stops or chocks 42 Fig. 1 on the underside of the bracket 2, it is necessary to pull out the cables 3 in order to form a cradle for the bomb. This is only possible by first turning the cover 32 of the clutch shell 27 by means of the thumb plates 33, and pressing back the balls or rollers 29 of the clutch or detent into the inoperative position. Thereupon the cables 3 are freely drawn out, against the action of the spring 20, to the required length and passed under the bomb, and the yoke 38 is hooked to the releasable catch 4. The cover 32 is now released and the balls 29 are thus permitted to resume their operative position under the action of the spring plungers 31. The hand wheel 15 is now turned to drive the worm wheel 13, worm wheel 12 and axial shaft 10 in the appropriate direction. The shaft 10, through the free wheel clutch 29—33, drives the sun wheel 26 which drives the intermediate or planet wheels 25, and the latter drive the internally toothed annulus 23 which turns the drum 16 in the direction for applying tension to the cables 3. When the tension is sufficient and the turning of the hand wheel 15 ceases, the cables 3 cannot pull out of the drum 16 and slacken, because the drum 16 is held locked through the gearing 23, 25, 26 the free wheel clutch 29—33, the axial shaft 10 and the worm gear 12, 13 which is self-locking or irreversible in the well-known manner. The bomb 1 is therefore held tightly by its cradle 3 until the moment of release. Immediately the cables 3 are freed, the spring 20 revolves the drum 16 on the axial shaft 10 and winds them in, the clutch shell 27 being meanwhile driven by the gearing 23, 25, 26 in the non-clutching or free-wheeling direction. The winding in is terminated by the yoke 38 coming against the rubber facing 37 which reduces the shock.

According to a modified construction illustrated in Figure 8 a spring drum device 43 is pivotally mounted at 44 upon a bowed arm 45 one end of which is pivotally suspended from one eye of the bracket 2.

The bowed arm 45 extends over and around the casing of the spring drum device 43 and at its opposite end is formed with a boss 46 having a screw threaded hole. A screw 47 operated by a hand wheel 48 works in this boss and presses with its inner and rounded end against a seating 49 on an abutment surface formed on the casing of the drum device 43. The spring drum device 43 may be of generally similar construction to that above described except that the worm and toothed gearing operated by the hand wheel 15 are omitted and the free wheel clutch device 29—33 is adapted to operate directly between the shaft 10 and drum 16, the shaft 10 being non-revolubly mounted in this case.

In the operation of this construction, the cables 3 are drawn out from the spring drum device 43 against the action of a spring similar to the spring 20, after first moving the balls of the clutch or detent to the inoperative position. The cables 3 are then lapped around the bomb 1 to form a cradle, the yoke 38 is releasably secured to the bracket 2 and the balls of the clutch or detent device are permitted to return to the normal and operative position. The hand wheel 48 is now operated for inward feeding of the screw 47, so that the latter rocks the drum device 43 about its pivot 44 in the direction for applying tension to the cables 3 of the cradle. These cables cannot withdraw from the drum device 43 and slacken because the drum is now locked against reverse revolution by the clutch or detent device. Immediately the cables 3 are freed by bomb release, the spring drives the drum in the direction for winding in the cables. The pivotal mounting of the bowed arm 45 enables the drum device 43 to move towards or from the bomb 1 as the convolutions on the drum decrease or increase during the unwinding or winding on operations.

In the further modification illustrated in Figure 9, the spring drum device 45 is pivotally suspended by a screw 50 working in a hand nut 51 pivotally supported in an eye of the bracket 2. The only difference between this arrangement and that shown in Figure 8 is that the hand nut 51 is revolved to pull the screw 50 and spring drum device 45 upwards, when tension is to be applied to the cables 3 of the cradle.

Figure 2:
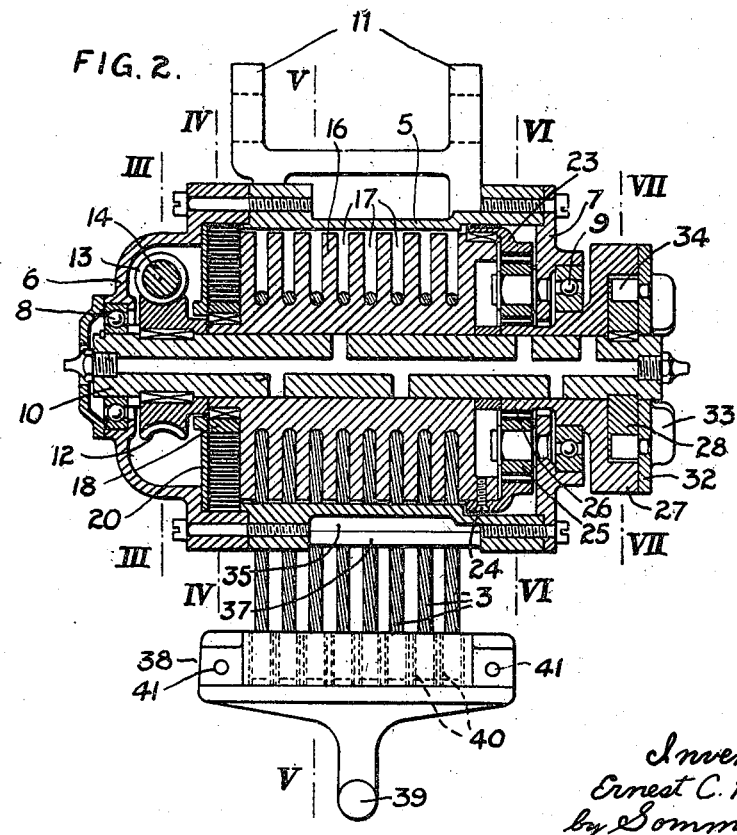
Figure 2 is a longitudinal section to a larger scale of the spring drum device 5 seen in Figure 1.

In Figure 10 a face ratchet clutch takes the place of the ball or roller clutch 27 to 29 of Figures 2 and 7. Instead of the extended hub of the sun wheel 26 being enlarged to form a hollow cylindrical shell 27, as in Figure 2, it is here enlarged to form a disc 27a, the face of this disc being formed with radial ratchet teeth 52. A co-operative clutch part 53 is feathered on the shaft 10 and is normally urged into clutching engagement by a spring 54 acting between an internal shoulder of the clutch part 53 and an abutment disc 55 fixed on the end of the shaft 10. A knob 56 screwed on the clutch part 53 enables the latter to be pulled out for declutching. The operation of this construction is the same as that described with reference to Figures 2 to 7 except that when the cables 3 are to be pulled out from the drum to form a cradle, the knob 56 is operated to declutch the part 53 from the disc 27a. When the cables 3 have been sufficiently withdrawn and formed into a cradle, the knob 56 is released and the spring 54 again clutches the parts 53 and 27a. Consequently the shaft 10 can now drive the drum 16 through the clutch 53, 27a and gearing 23 to 26 in the direction for applying tension to the cables. When the cables are freed for bomb-release, and the drum 16 is driven by its spring to wind in the cables, the part 27a will be driven through the gearing 23, 25, 26 in the direction in which its ratchet teeth slip past those of the clutch part 53.

Devices in accordance with these improvements are simple and fool-proof and can be made of light construction because the drum 16, which is the most massive part can be a light alloy casting. The said devices not only protect the structure against damage by flying cable ends and afford secure cradling but they also facilitate expeditious loading of an aircraft with its complement of bombs.

I claim:

1. In a bomb sling device wherein the sling is composed of a plurality of flexible elements which are windable into respective grooves of a winding drum, the combination of a manually operable self-sustaining worm and worm wheel gearing, a mechanical advantage gear train operative between the worm wheel of said gearing and said drum, a one-way clutch operative for permitting one-way operation only of said drum by said gearing and gear train, manually operable release means operatively connected with said clutch, and drum-driving means operative for revolving said drum and causing it to overrun said clutch for the quick winding in of said sling when unloaded.

2. In a bomb sling device wherein the sling is composed of a plurality of flexible elements which are windable into respective grooves of a winding drum, the combination of a manually operable self-sustaining worm and worm wheel gearing, a mechanical advantage gear train operative between the worm wheel of said gearing and said drum, a one-way clutch operative for permitting one-way operation only of said drum by said gearing and gear train, manually operable release means operatively connected with said clutch, and a coil spring operative for revolving said drum and causing it to overrun said clutch for the quick winding in of said sling when unloaded.

ERNEST CHARLES HATCHER.